United States Patent
Tseng

(10) Patent No.: US 9,435,413 B2
(45) Date of Patent: Sep. 6, 2016

(54) TRANSMISSION POWER SWITCH DEVICE ASSEMBLED WITH ROTARY SHAFT

(75) Inventor: Sheng-Tsai Tseng, Taoyuan County (TW)

(73) Assignees: Sheng-Tsai Tseng, Taoyuan (TW); Wei-Fu Tseng, Taoyuan (TW); Yu-Fu Tseng, Hsinchu (TW); Kao-Fu Tseng, Taoyuan (TW); Lan-Ying Liu, Miaoli County (TW)

(*) Notice: Subject to any disclaimer, the term of this patent is extended or adjusted under 35 U.S.C. 154(b) by 0 days.

(21) Appl. No.: 14/394,613

(22) PCT Filed: Apr. 23, 2012

(86) PCT No.: PCT/CN2012/074504
§ 371 (c)(1),
(2), (4) Date: Oct. 15, 2014

(87) PCT Pub. No.: WO2013/159269
PCT Pub. Date: Oct. 31, 2013

(65) Prior Publication Data
US 2015/0107409 A1   Apr. 23, 2015

(51) Int. Cl.
*F16H 3/34* (2006.01)
*F16H 37/08* (2006.01)
*F16H 37/02* (2006.01)
*F16H 63/30* (2006.01)

(52) U.S. Cl.
CPC .......... *F16H 37/027* (2013.01); *F16H 63/302* (2013.01); *F16H 63/304* (2013.01); *F16H 2063/3093* (2013.01); *Y10T 74/19019* (2015.01)

(58) Field of Classification Search
CPC .. F16H 3/30; F16H 3/085; F16H 2003/0826; F16H 2003/123

USPC .......................................... 74/352, 355, 664
See application file for complete search history.

(56) References Cited

U.S. PATENT DOCUMENTS

| | | | | |
|---|---|---|---|---|
| 2,835,143 | A * | 5/1958 | Kelbel | B60K 17/344 180/250 |
| 3,507,371 | A * | 4/1970 | Richard | F16H 3/12 188/152 |
| 3,802,293 | A * | 4/1974 | Winckler | F16H 3/097 74/331 |
| 4,802,375 | A * | 2/1989 | Stodt | F16H 3/097 74/331 |
| 5,184,522 | A * | 2/1993 | Nordkvist | F16H 3/091 74/331 |
| 5,640,882 | A * | 6/1997 | Mueller | B60K 17/08 74/333 |
| 6,612,960 | B1 * | 9/2003 | Hoyer | F16H 3/089 475/302 |
| 7,556,077 | B2 * | 7/2009 | Chou | B32B 37/0053 156/555 |
| 8,663,046 | B2 * | 3/2014 | Torrelli | B60K 6/387 475/5 |
| 2010/0311540 | A1 * | 12/2010 | Hellenbroich | B60K 6/40 477/5 |

* cited by examiner

*Primary Examiner* — Ha D Ho
(74) *Attorney, Agent, or Firm* — Rosenberg, Klein & Lee

(57) ABSTRACT

A transmission power switch device assembled with rotary shaft has a simplified structure and provides power transmission and switching effect. The transmission power switch device includes a rotary shaft connected with a power source. On the rotary shaft are disposed a first drive mechanism, a second drive mechanism and a brake device rotatable with the rotary shaft. The brake device is movable on the rotary shaft to selectively brake the first drive mechanism or the second drive mechanism so as to transmit power to an output shaft.

29 Claims, 7 Drawing Sheets

TRANSMISSION POWER SWITCH DEVICE ASSEMBLED WITH ROTARY SHAFT

BACKGROUND OF THE INVENTION

1. Field of the Invention

The present invention relates generally to a transmission power switch device, and more particularly to a transmission power switch device assembled with rotary shaft. The transmission power switch device is applied to vehicle system and has a simplified structure. The transmission power switch device includes a brake device. The brake device is movable on the rotary shaft to directly selectively brake a first drive mechanism or a second drive mechanism so as to transmit power to an output shaft.

2. Description of the Related Art

A conventional transmission device, a gear set and a differential mechanism are applied to a vehicle to transmit power and advance or reverse or idle the vehicle. For example, Taiwanese Patent No. 87217364 (U.S. Pat. No. 6,146,306) discloses an automobile transmission device.

The existent vehicle transmission systems include manual transmission system, automatic transmission system and continuous transmission system. The power of the rotary shaft of the engine or motor is transmitted to an output shaft via a transmission control mechanism, an input gear set mounted on an input shaft, a (bevel gear) differential mechanism disposed on an output shaft and an output gear set. Accordingly, the vehicle can be driven by different transmission ratios. Basically, the transmission control mechanism includes multiple spring-like bodies and control push sleeves respectively mounted inside and outside the input gear set. A manual or an automatic transmission control electro-apparatus is used to control a turbine disc to rotate so as to selectively drive different balls (or push rods) to push the control push sleeves for engaging the spring-like bodies with the input gear set or disengaging the spring-like bodies from the input gear set. Accordingly, the input gear set with different tooth numbers respectively drives the output gear set and the differential mechanism, whereby the output shaft can drive the vehicle by different rotational speeds.

The above power transmission device and the cooperative structures thereof can be redesigned and simplified to be different from the conventional technique and more direct and simpler than the conventional technique in operation and power transmission. In this case the power transmission form is changed and distinguishable from the conventional technique.

SUMMARY OF THE INVENTION

It is therefore a primary object of the present invention to provide a transmission power switch device assembled with rotary shaft. The transmission power switch device is applied to a vehicle and has a simplified structure.

To achieve the above and other objects, the transmission power switch device assembled with rotary shaft of the present invention includes a rotary shaft defined with an axis, on the rotary shaft being disposed a freely rotatable first drive mechanism, a free rotatable second drive mechanism and a brake device rotatable with the rotary shaft, wherein: the first drive mechanism having a drive gear mounted on the rotary shaft and a driven gear driven by the drive gear; the second drive mechanism having a drive gear mounted on the rotary shaft and a driven gear driven by the drive gear of the second drive mechanism; and the brake device being at least movable between a first position and a second position to selectively brake the first drive mechanism or the second drive mechanism to output power.

In the above transmission power switch device, each of the drive gear of the first drive mechanism and the drive gear of the second drive mechanism is defined with an end face and teeth formed on the end face.

In the above transmission power switch device, the first drive mechanism is a reducing gear mechanism, the drive gear of the first drive mechanism being engaged with the driven gear of the first drive mechanism.

In the above transmission power switch device, the drive gear of the first drive mechanism is mounted on the rotary shaft via a bearing, the drive gear of the first drive mechanism being freely rotatable on the rotary shaft, the driven gear of the first drive mechanism being keyed on an input shaft, the driven gear of the first drive mechanism being synchronously rotatable with the input shaft.

In the above transmission power switch device, the drive gear of the second drive mechanism is mounted on the rotary shaft via a bearing, the drive gear of the second drive mechanism being freely rotatable on the rotary shaft, the driven gear of the second drive mechanism being mounted on an output shaft.

In the above transmission power switch device, the driven gear of the second drive mechanism is mounted on a differential mechanism, the differential mechanism having an output sleeve, the output sleeve and the driven gear of the second drive mechanism being keyed with each other, the driven gear of the second drive mechanism being synchronously rotatable with the output sleeve.

In the above transmission power switch device, the brake device includes two end faces respectively defined as a first end face and a second end face, the first and second end faces being respectively provided with toothed sections.

In the above transmission power switch device, the brake device is freely movably connected on a sleeve member, the sleeve member being prepositioned on the rotary shaft via a key, whereby the brake device and the rotary shaft are synchronously rotatable.

In the above transmission power switch device, the sleeve member is formed with a rail and the brake device is formed with a channel corresponding to the rail, whereby the brake device is fitted on the sleeve member and movable along the rail.

In the above transmission power switch device, a shift tool is assembled with the brake device, the shift tool serving to push the brake device to move in a direction parallel to the axis x of the rotary shaft.

In the above transmission power switch device, the brake device is formed with a recess and the shift tool is at least partially detained in the recess.

In the above transmission power switch device, the shift tool is defined with a fixed end and a free end positioned in the recess, the fixed end being pivotally connected on a shaft, whereby the free end is freely swingable.

In the above transmission power switch device, a belt or chain is mounted and connected between the drive gear and driven gear of the second drive mechanism.

In the above transmission power switch device, a driven gear is disposed between the drive gear and driven gear of the second drive mechanism, the driven gear being engaged with the drive gear of the second drive mechanism and the driven gear of the second drive mechanism.

In the above transmission power switch device, the driven gear is freely rotatably mounted on an input shaft via a bearing.

In the above transmission power switch device, the each of the drive gear of the first drive mechanism and the drive gear of the second drive mechanism is defined with an end face and teeth formed on the end face, the brake device including two end faces respectively defined as a first end face and a second end face, the first and second end faces being respectively provided with toothed sections, when the brake device is positioned in the first position, the toothed sections of the first end face being engaged with the teeth of the drive gear of the first drive mechanism, the drive gear of the first drive mechanism being synchronously rotatable with the rotary shaft, when the brake device is positioned in the second position, the toothed sections of the second end face being engaged with the teeth of the drive gear of the second drive mechanism, the drive gear of the second drive mechanism being synchronously rotatable with the rotary shaft.

In the above transmission power switch device, a belt or chain and a driven gear are disposed between the drive gear and driven gear of the second drive mechanism.

In the above transmission power switch device, the driven gear is freely rotatably mounted on an input shaft via a bearing, the driven gear being engaged with the drive gear of the second drive mechanism, the belt or chain being mounted on the driven gear and the driven gear of the second drive mechanism, when the drive gear of the second drive mechanism is synchronously rotated with the rotary shaft, the drive gear of the second drive mechanism driving the driven gear to drive the belt or chain so as to drive the driven gear of the second drive mechanism to drive an output shaft.

In the above transmission power switch device, the brake device is pushed by a manual control system.

In the above transmission power switch device, the brake device is pushed by an automatic control system.

In the above transmission power switch device, the brake device has the form of a wheel-like structure.

In the above transmission power switch device, the rotary shaft is connected with a power source, which is a motor.

In the above transmission power switch device, the rotary shaft is connected with a power source, which is an engine.

In the above transmission power switch device, the rotary shaft includes an input shaft.

In the above transmission power switch device, the rotary shaft includes an output shaft.

In the above transmission power switch device, the rotary shaft is connected with a power source, the power source serving to transmit power to an input shaft and an output shaft.

In the above transmission power switch device, the input shaft is provided with an input gear set and a transmission control section, the input gear set being at least provided with a spring-like body, a transmission sleeve and a control push sleeve, the rotational power of the input shaft being transmitted through the control push sleeve to the spring-like body to rotate the input gear set.

In the above transmission power switch device, the transmission control section includes a transmission control electro-apparatus and a rotary disc driven by the transmission control electro-apparatus, the rotary disc serving to control and push the control push sleeve.

In the above transmission power switch device, an output gear set is mounted on the output shaft, the output gear set having multiple output gears, a one-way bearing being disposed between each two output gears.

In the above transmission power switch device, a differential mechanism and an output sleeve are mounted on the output shaft, an output gear set being mounted on the output sleeve, the output gear set having multiple output gears, each output gear being freely rotatably mounted on the output sleeve via a bearing.

The transmission power switch device assembled with rotary shaft of the present invention is characterized and advantageous in that the transmission power switch device includes a rotary shaft connected with a power source. On the rotary shaft are disposed a first drive mechanism, a second drive mechanism and a brake device rotatable with the rotary shaft. The brake device is movable on the rotary shaft to selectively brake the first drive mechanism or the second drive mechanism so as to transmit power to an output shaft.

In the above transmission power switch device, the brake device has the form of a circular structure or a wheel-like structure. The brake device includes two end faces, which is respectively defined as a first end face and a second end face. The first and second end faces are respectively formed with toothed sections. When the brake device is moved to first drive mechanism or the second drive mechanism, the first end face or the second end face drives the first drive mechanism or the second drive mechanism.

In the above transmission power switch device, the brake device is mounted (or prepositioned) on a rotary shaft of an engine or a motor. The brake device is formed with a recess. The shift tool is at least partially detained in the recess. The shift tool serves to push the brake device to move on the rotary shaft or in a direction parallel to the axis x of the rotary shaft, whereby the first end face of the brake device selectively drives the first drive mechanism or the second end face of the brake device selectively drives the second drive mechanism.

The transmission power switch device assembled with rotary shaft has a simplified structure and provides power transmission and switching effect.

The present invention can be best understood through the following description and accompanying drawings, wherein:

DETAILED DESCRIPTION OF THE PREFERRED EMBODIMENTS

Figure 1:
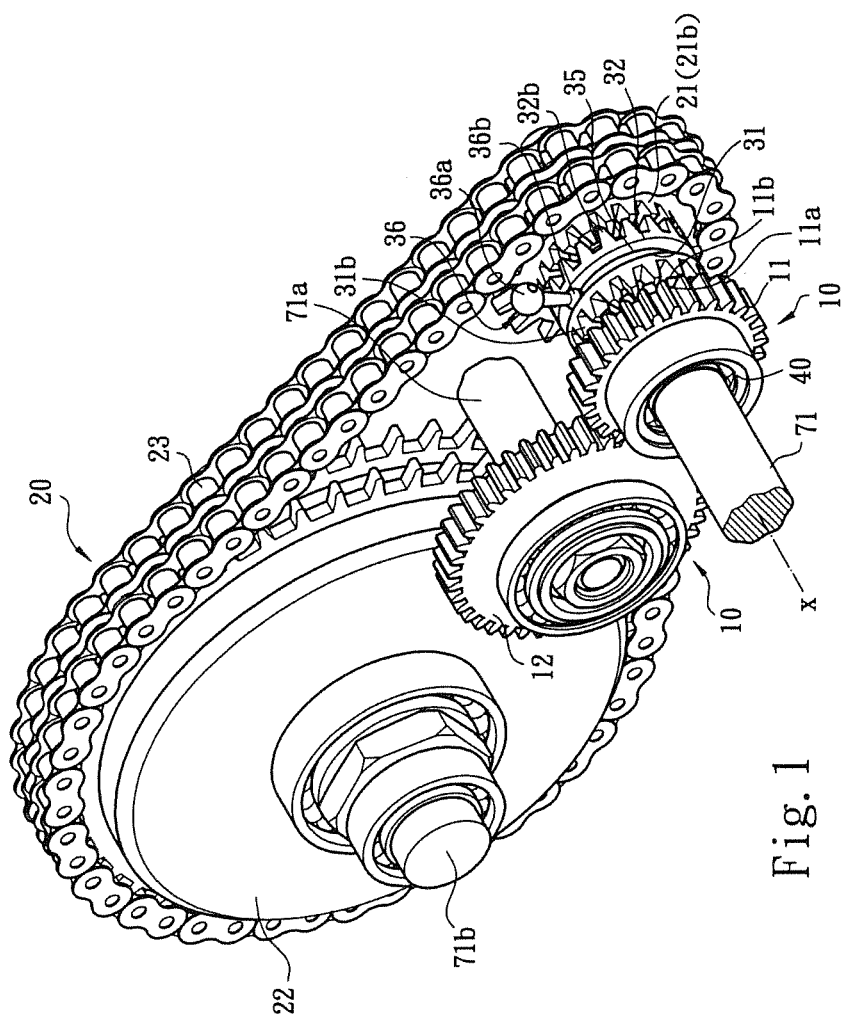
FIG. 1 is a perspective assembled view of the transmission power switch device assembled with rotary shaft of the present invention.
Figure 2:
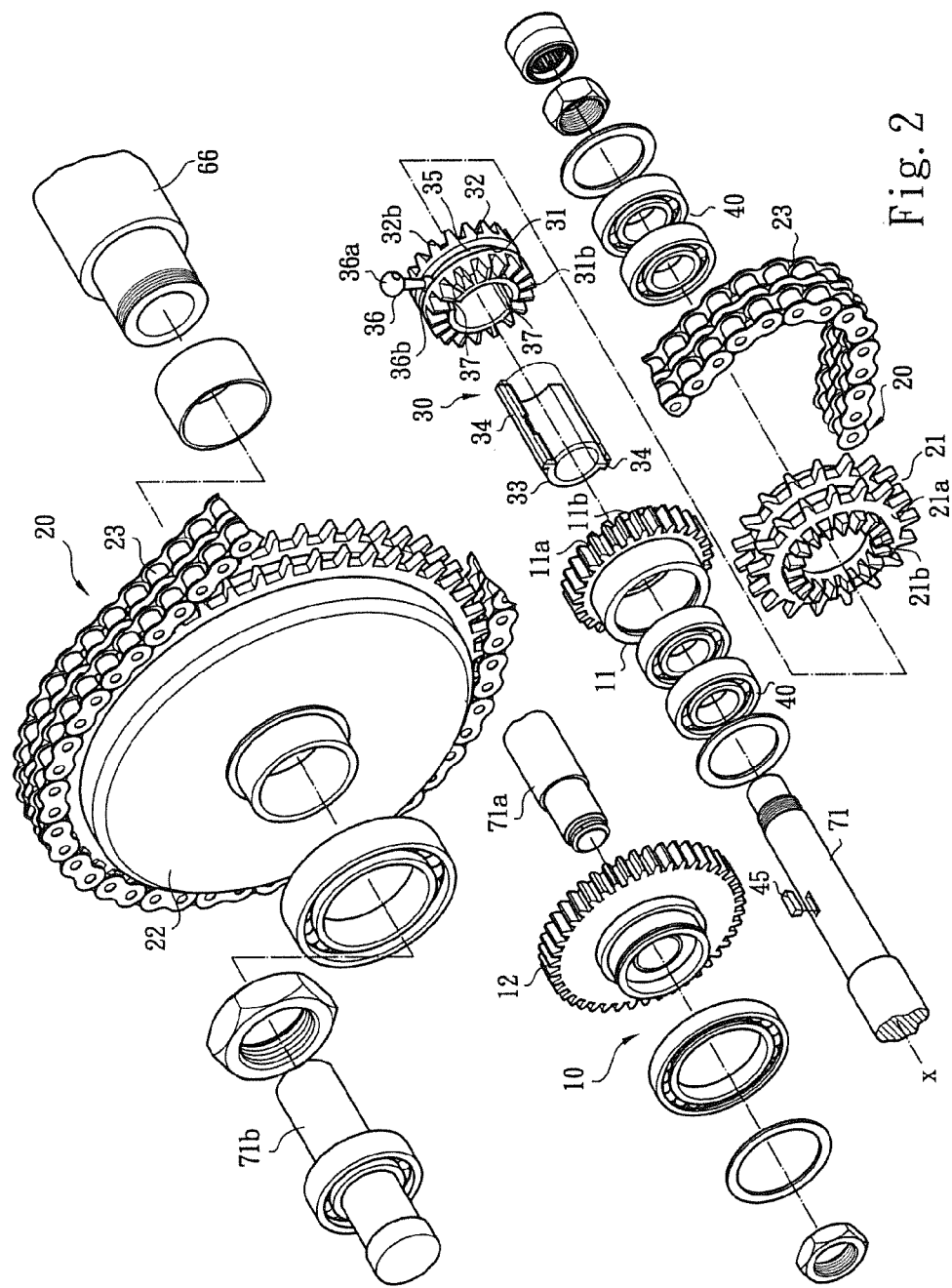
FIG. 2 is a perspective exploded view of the transmission power switch device assembled with rotary shaft of the present invention.
Figure 3:
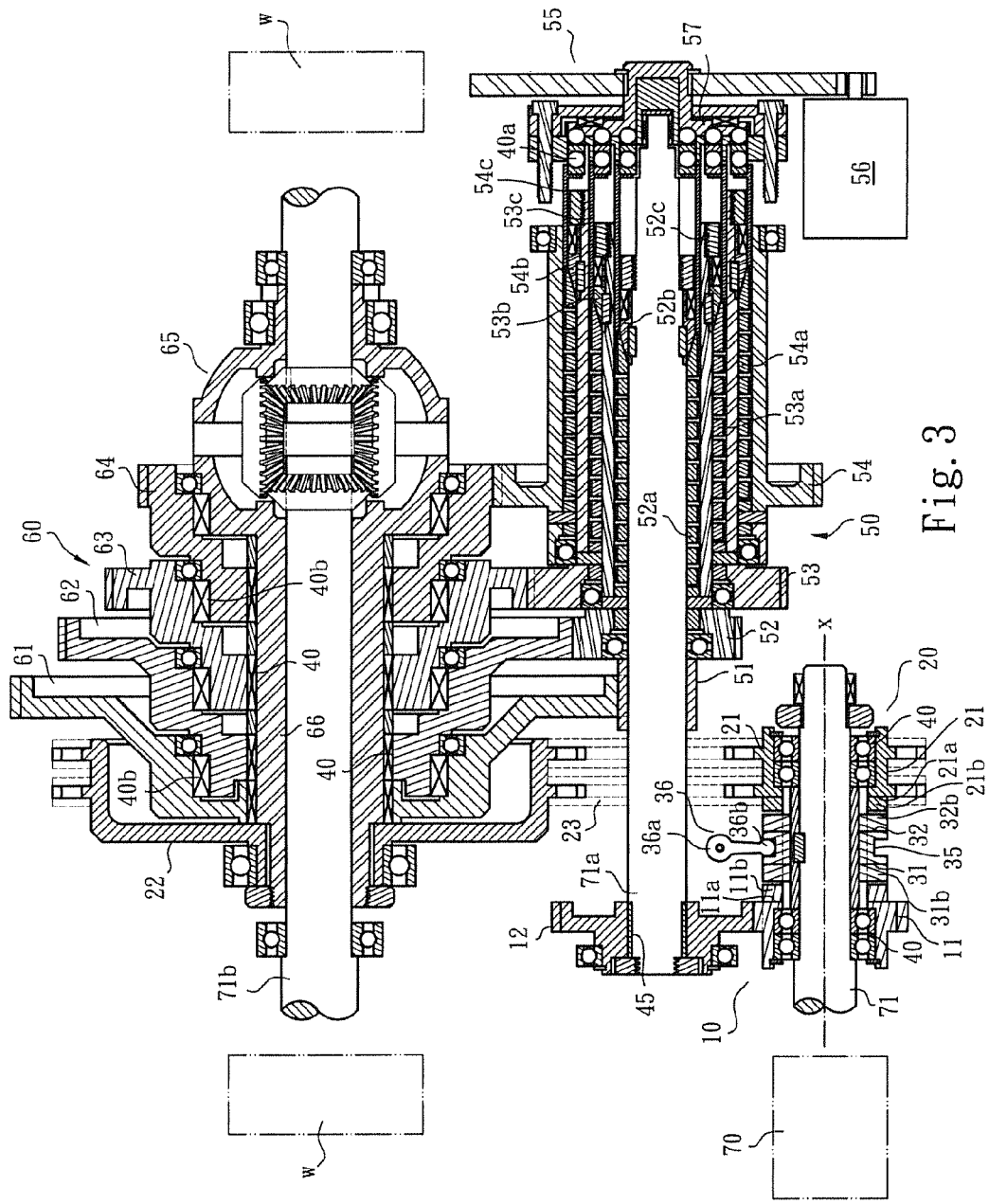
FIG. 3 is a sectional assembled view of the transmission power switch device assembled with rotary shaft of the present invention, showing that the present invention is assembled with an input gear set, a transmission control section, an output gear set and a differential mechanism.

Please refer to FIGS. 1, 2 and 3. The transmission power switch device assembled with rotary shaft of the present invention includes a rotary shaft 71 connected to a power source 70. The power source 70 (as shown in FIG. 3) has the form of a motor, an internal combustion engine or an engine to provide rotational power for the rotary shaft 71. In a preferred embodiment, the rotary shaft 71 includes an input shaft 71a and an output shaft 71b. In this embodiment, the rotary shaft 71 is disposed on the power source 70 for transmitting the power to the input shaft 71a and the output shaft 71b.

Referring to FIGS. 1 and 2, on the rotary shaft 71 are disposed a first drive mechanism 10, a second drive mechanism 20 and a brake device 30 rotatable with the rotary shaft 71. The first drive mechanism 10 is selectively a reducing gear mechanism including a (reducing) drive gear 11 and a (reducing) driven gear 12. The drive gear 11 and the driven gear 12 are drivingly engaged with each other. To speak more specifically, the drive gear 11 is mounted on the rotary shaft 71 via a bearing 40, whereby the drive gear 11 can freely rotate on the rotary shaft 71 without synchronously rotating with the rotary shaft 71. The driven gear 12 is keyed on the input shaft 71a by means of a key 45, whereby the driven gear 12 is synchronously rotatable with the input shaft 71a. As shown in the drawings, the drive gear 11 is defined with an end face 11a and teeth 11b formed on the end face 11a.

In this embodiment, the second drive mechanism 20 includes a drive gear 21 and a driven gear 22. The drive gear 21 and the driven gear 22 are drivingly engaged with each other. The drive gear 21 is mounted on the rotary shaft 71 via a bearing 40, whereby the drive gear 21 can freely rotate on the rotary shaft 71 without synchronously rotating with the rotary shaft 71. The driven gear 22 is keyed or mounted on an output sleeve 66 of a differential mechanism 65. The output sleeve 66 will transmit power to the output shaft 71b. (This will be further described hereinafter). Moreover, the driven gear 22 and the output sleeve 66 are synchronously rotatable. As shown in the drawings, the drive gear 21 is defined with an end face 21a and teeth 21b formed on the end face 21a.

Please again refer to FIGS. 1, 2 and 3. The brake device 30 is disposed between the first drive mechanism 10 and the second drive mechanism 20. The brake device 30 has the form of a circular structure or a wheel-like structure. The brake device 30 includes two end faces, that is, a first end face 31 and a second end face 32. The first and second end faces 31, 32 are respectively formed with toothed sections 31b, 32b. In this embodiment, the brake device 30 is connected on a slide sleeve or sleeve member 33. The brake device 30 is freely movable on the sleeve member 33. The sleeve member 33 is fixed (or prepositioned) on the rotary shaft 71 by means of a key 45. Therefore, the brake device 30, the sleeve member 33 and the rotary shaft 71 are synchronously rotatable.

In a modified embodiment, the sleeve member 33 is formed with a rail 34. The brake device 30 is formed with a channel 37 corresponding to the rail 34. Accordingly, after the brake device 30 is fitted on the sleeve member 33, the brake device 30 can be moved left and right along the rail 34 in the direction of the drawings. A shift tool 36 can be used to push the brake device 30 to move on the rotary shaft 71 or in a direction parallel to an axis x of the rotary shaft 71. In this case, the first end face 31 of the brake device 30 is selectively urged to drive the first drive mechanism 10 or the second end face 32 of the brake device 30 is selectively urged to drive the second transmission mechanism 20.

As shown in the drawings, the brake device 30 is formed with a recess 35. The shift tool 36 is at least partially detained in the recess 35. To speak more specifically, the shift tool 36 can be freely left and right (or back and forth) moved or rotated. In this embodiment, the shift tool 36 is defined with a fixed end 36a and a free end 36b positioned in the recess 35. The fixed end 36a is pivotally connected on a shaft, whereby the free end 36b is freely swingable. The brake device 30 is manually pushed or pushed by means of an automatic control system.

In a preferred embodiment, the input shaft 71a is provided with an input gear set 50 and a transmission control section 55. As shown in the drawings, the input gear set 50 is selectively a four-gear transmission system. Therefore, the input gear set 50 includes a first input gear 51, a second input gear 52, a third input gear 53 and a fourth input gear 54. The first input gear 51 is directly disposed or fixed on the input shaft 71a. In the second, third and fourth input gears 52, 53, 54 are disposed spring-like bodies 52a, 53a, 54a, transmission sleeves 52b, 53b, 54b and control push sleeves 52c, 53c, 54c. Basically, the rotational power of the input shaft 71a is transmitted to the spring-like bodies 52a, 53a, 54a via the transmission sleeves 52b, 53b, 54b to make the second, third and fourth input gears 52, 53, 54 rotate.

In this embodiment, the transmission control section 55 includes an (automatic) transmission control electro-apparatus 56. According to the detected rotational speed of the input shaft 71a, the (automatic) transmission control electro-apparatus 56 can control a (turbine) rotary disc 57 to rotate so as to control a push rod or thrust bearing 40a to push or not to push the control push sleeves 52c, 53c, 54c. When the push rod or the thrust bearing 40a pushes the control push sleeves 52c, 53c, 54c to move to left side of FIG. 3, the spring-like bodies 52a, 53a, 54a are forced to move to the left side of the drawing and disengage from the transmission sleeves 52b, 53b, 54b. Under such circumstance, it will be impossible for the transmission sleeves 52b, 53b, 54b to transmit the power to the spring-like bodies 52a, 53a, 54a and the second, third and fourth input gears 52, 53, 54. In the case that the control push sleeves 52c, 53c, 54c are not pushed by the push rod or the thrust bearing 40a to move, the spring-like bodies 52a, 53a, 54a keep engaged with the transmission sleeves 52b, 53b, 54b. Under such circumstance, the transmission sleeves 52b, 53b, 54b will transmit the power of the input shaft 71a to the spring-like bodies 52a, 53a, 54a and the second, third and fourth input gears 52, 53, 54 as aforesaid. It should be noted that the transmission control section 55 is also manually operable.

An output gear set 60 is mounted on the output shaft 71b corresponding to the input gear set 50. The output gear set 60 is also selectively a four-gear transmission system. Therefore, the output gear set 60 includes a first output gear 61, a second output gear 62, a third output gear 63 and a fourth output gear 64, which are freely rotatable. The first, second, third and fourth output gears 61, 62, 63, 64 are respectively engaged with the first, second, third and fourth input gears 51, 52, 53, 54. A one-way bearing 40b is disposed between each two output gears, whereby only a lower-rank output gear can drive a higher-rank output gear, while a higher-rank output gear cannot drive a lower-rank output gear. For example, the first output gear 61 can drive the second, third and third output gears 62, 63, 64 and the differential mechanism 65 and the second output gear 62 can drive the third and fourth output gears 63, 64 and the differential mechanism 65, while it is impossible for the fourth output gear 64 to drive the third output gear 63 or the second output gear 62 or the first output gear 61. The third output gear 63 can only drive the fourth output gear 64, while being unable to drive the second output gear 62 or the first output gear 61.

In this embodiment, the differential mechanism 65 and the output sleeve 66 are mounted on the output shaft 71*b*. Two ends of the output shaft 71*b* are pivotally connected with vehicle wheels W as shown by the phantom lines of the drawings. Each output gear is provided with a (roller) bearing 40, whereby the output gears are freely rotatably mounted on the output sleeve 66 of the differential mechanism 65. Therefore, when the input gear set 50 drives the output gear set 60 to rotate, the output gear set 60 will drive the differential mechanism 65 and the output sleeve 66 to rotate. Accordingly, the output shaft 71*b* can drive the vehicle wheels W to rotate by different rotational speeds.

The cooperative structures and transmission operation, (for example, the four-gear transmission system is selected to achieve 8 stages of speeds) of the input gear set 50, the transmission control section 55, the output gear set 60 and the differential mechanism 65 pertain to prior art and thus will not be further described hereinafter.

It should be noted that the drive gear 21 and the driven gear 22 of the second drive mechanism 20 are engaged with each other. In a preferred embodiment, a belt or chain 23 is mounted and connected between the drive gear 21 and the driven gear 22. That is, the power of the drive gear 21 is transmitted through the belt or chain 23 to the driven gear 22 to make the driven gear 22 rotate.

Figure 4:
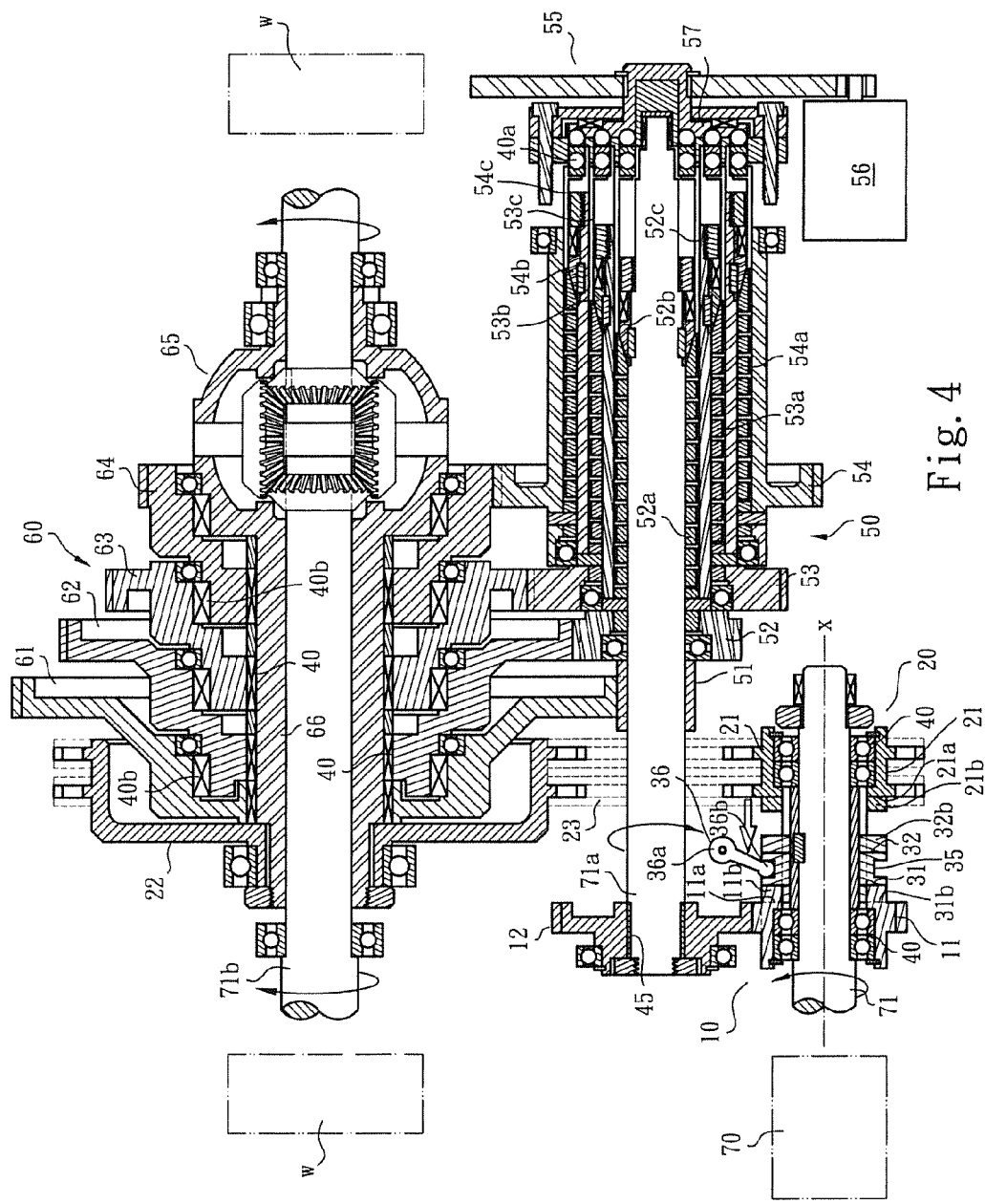
FIG. 4 is a sectional assembled view according to FIG. 3, showing that the brake device drives the first drive mechanism.

Please refer to FIG. 4. After the free end 36*b* of the shift tool 36 is operated or controlled to drive the brake device 30 to move toward left side of the drawing, the toothed sections 31*b* of the first end face 31 of the brake device will engage with the teeth 11*b* of the drive gear 11 of the first drive mechanism to drive the drive gear 11 to synchronously rotate with the transmission shaft 71. (At this time, the position where the brake device 30 is positioned is defined as a first position). Also, the drive gear 11 drives the (reducing) driven gear 12 to urge the input shaft 71*a* to rotate. Therefore, the input shaft 71*a* will urge the first input gear 51 to drive the first output gear 61 to synchronously rotate. Moreover, the power is transmitted through the second, third and fourth output gears 62, 63, 64 to the differential mechanism 65, whereby the output shaft 71*b* can drive the vehicle wheels W to rotate and advance the vehicle.

After the transmission control section 55 receives the signal of increase of rotational speed from the input shaft 71*a*, according to different rotational speeds of the input shaft 71*a*, the transmission control section 55 will control the automatic transmission control electro-apparatus 56 and the rotary disc 57 to select the second input gear 52, the third input gear 53 or the fourth input gear 54 of the input gear set 50 to drive the second output gear 62, the third output gear 63 or the fourth output gear 64 of the output gear set 60. Accordingly, the differential mechanism 65 can drive the output shaft 71*b* to produce different outputs of rotational speeds. It should be noted that when the transmission control section 55 makes the output shaft 71*b* produce different outputs of rotational speeds, the first drive mechanism 10 and the transmission shaft 71 of the transmission power switch device provides a system similar to an assistant engine brake.

Figure 5:
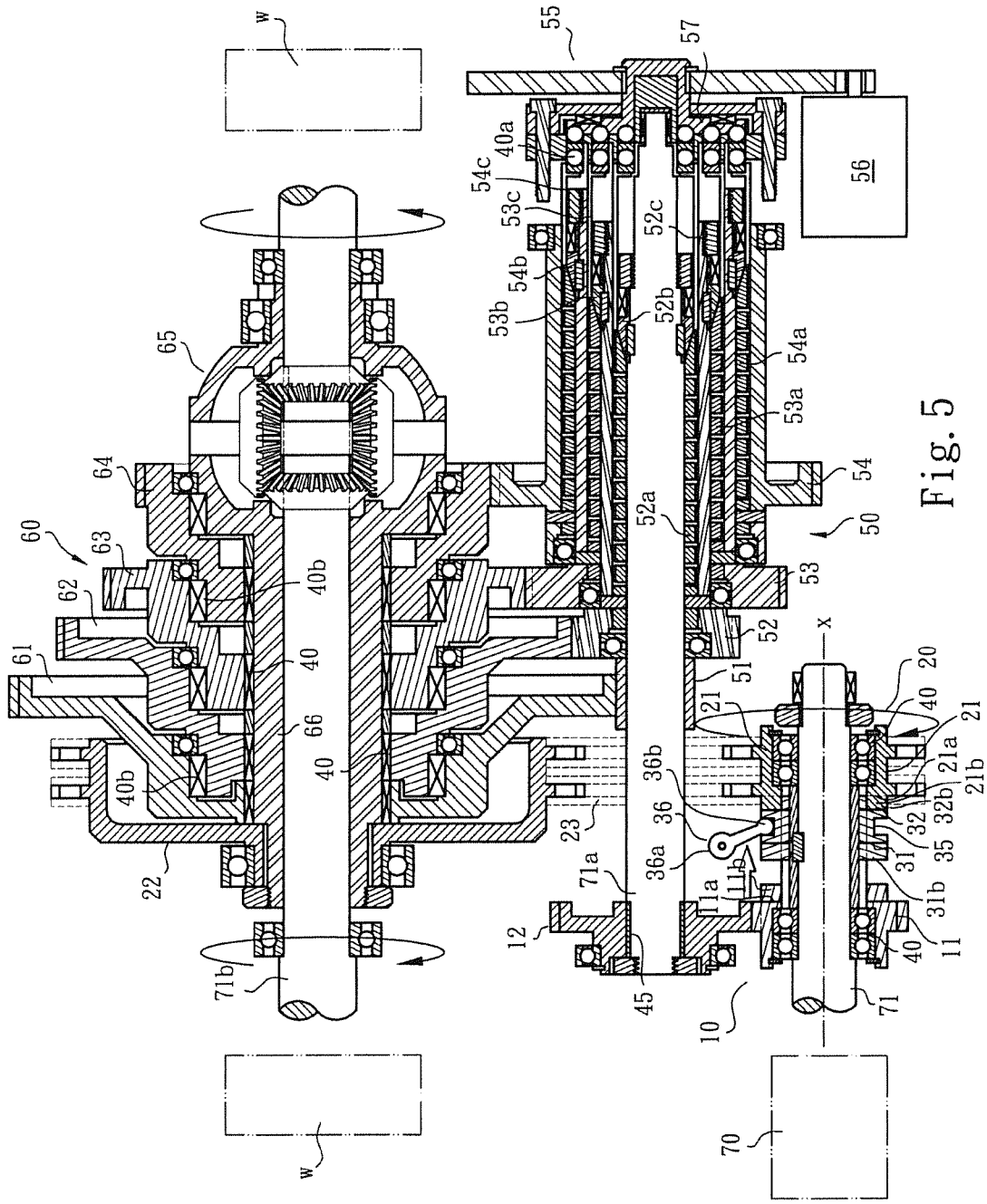
FIG. 5 is a sectional assembled view according to FIG. 3, showing that the brake device drives the second drive mechanism.

Please refer to FIG. 5. After the free end 36*b* of the shift tool 36 is operated or controlled to drive the brake device 30 to move toward right side of the drawing, the toothed sections 32*b* of the second end face 32 of the brake device will engage with the teeth 21*b* of the drive gear 21 of the second drive mechanism to drive the drive gear 21 to synchronously rotate with the transmission shaft 71. (At this time, the position where the brake device 30 is positioned is defined as a second position). Also, the drive gear 21 drives the driven gear 22 through the belt or chain 23 to urge the output sleeve 66 and the differential mechanism 65 to make the output shaft 71*b* drive the vehicle wheels W to rotate and reverse the vehicle.

As shown in FIGS. 3 to 5, via the brake device 30, the transmission power switch device slidably selectively drives the first drive mechanism 10 or the second drive mechanism 20 so as to control the vehicle to advance or reverse. Moreover, when the brake device 30 is positioned in a middle position (where the brake device 30 is neither drivingly engaged with the first drive mechanism 10 nor driving engaged with the second drive mechanism 20), the vehicle is idled. In comparison with the conventional technique, the present invention is more simplified in operation and cooperation.

In the embodiment as shown in FIG. 4, in case the rotary shaft 71 is counterclockwise rotated in a direction as shown by the arrow (seen from left side of the drawing), the brake device 30 can be operated to drive the drive gear 11 of the first drive mechanism 10 to counterclockwise rotate. Therefore, the driven gear 12 drives the input shaft 71*a* and the input gear set 50 to clockwise rotate, whereby the output gear set 60 is counterclockwise rotated to drive the differential mechanism 65, the output sleeve 66 and the output shaft 71*b* to counterclockwise rotate to advance the vehicle.

In the embodiment as shown in FIG. 5, in case the rotary shaft 71 is clockwise rotated in a direction as shown by the arrow (seen from left side of the drawing), the brake device 30 can be operated to drive the drive gear 21 of the second drive mechanism 20 to clockwise rotate. Therefore, the drive gear 21 drives the belt or chain 23 and the driven gear 22 to clockwise rotate, whereby the output sleeve 66, the differential mechanism 65 and the output shaft 71*b* are driven to clockwise rotate to reverse the vehicle.

Figure 6:
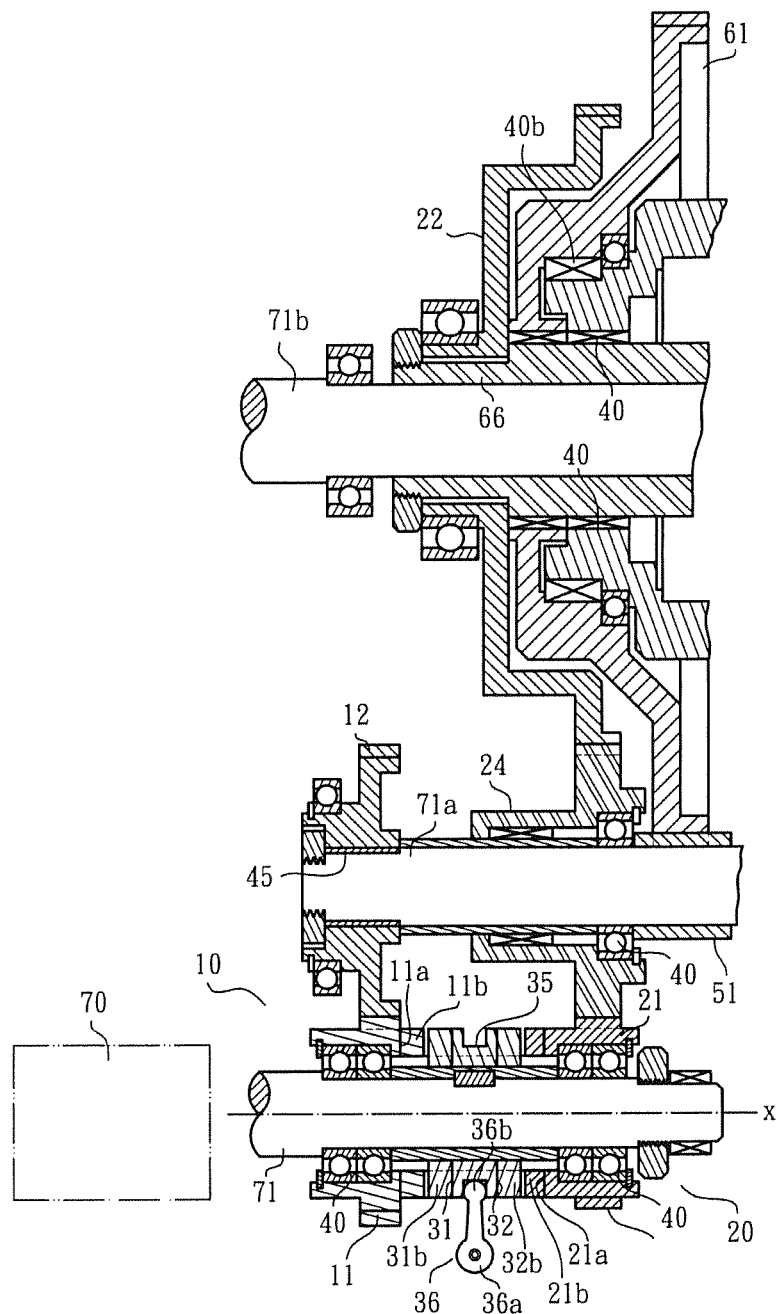
FIG. 6 is a sectional assembled view of a modified embodiment of the present invention, showing that a driven gear is disposed between the drive gear and the driven gear of the second drive mechanism.

Please now refer to FIG. 6, which shows a modified embodiment of the second drive mechanism 20. A driven gear 24 is disposed between the drive gear 21 and the driven gear 22 of the second drive mechanism 20. The driven gear 24 is freely rotatably mounted on the input shaft 71*a* via a bearing 40 and engaged with the drive gear 21 and the driven gear 22. Therefore, after the free end 36*b* of the shift tool 36 is operated or controlled to drive the brake device 30 to move toward right side of the drawing, the toothed sections 32*b* of the second end face 32 of the brake device will engage with the teeth 21*b* of the drive gear 21 of the second drive mechanism to drive the drive gear 21 to synchronously rotate with the transmission shaft 71. Also, the drive gear 21 drives the driven gear 24 to drive the driven gear 22 to drive the output sleeve 66 and the differential mechanism 65 to make the output shaft 71*a* drive the vehicle wheels W to rotate to reverse the vehicle.

Figure 7:
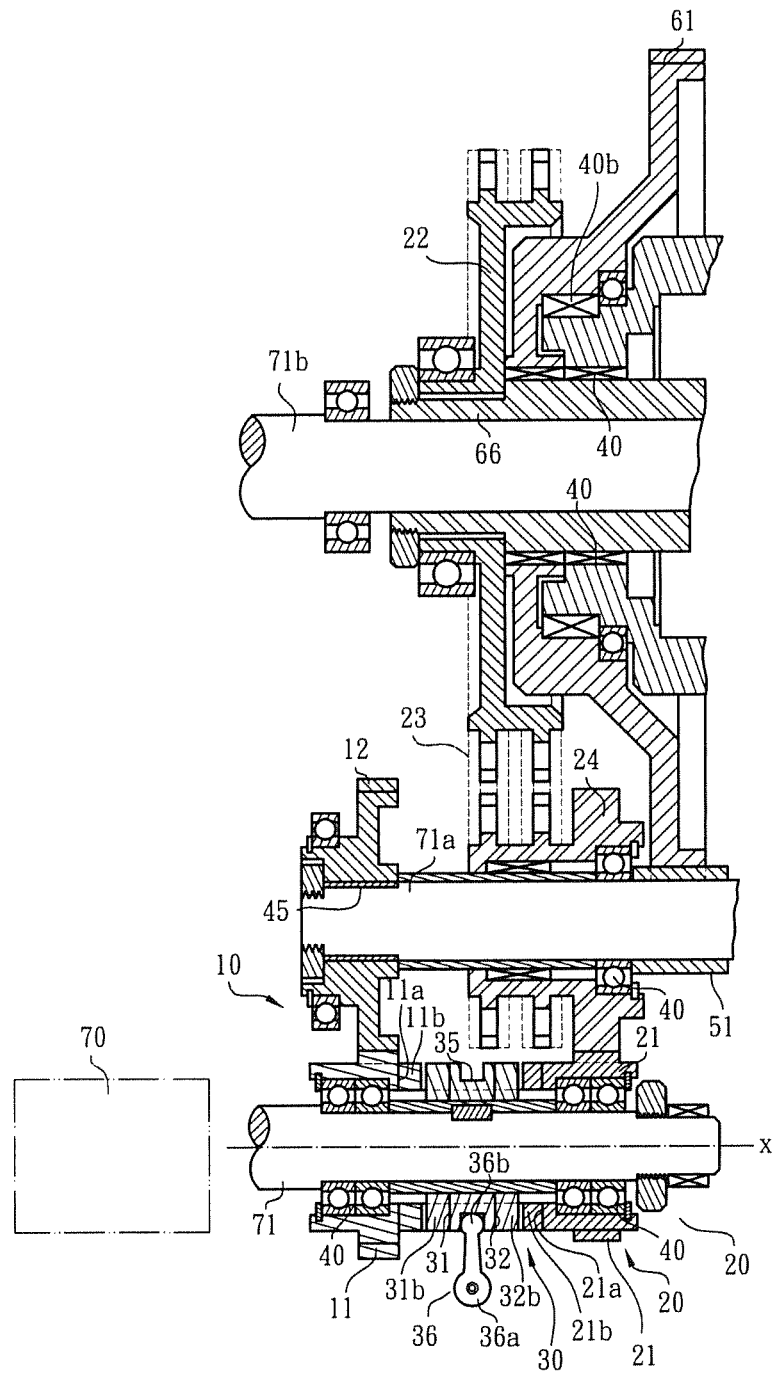
FIG. 7 is a sectional assembled view of another modified embodiment of the present invention, showing that a driven gear and a belt or chain are disposed between the drive gear and the driven gear of the second drive mechanism.

Please now refer to FIG. 7, which shows another modified embodiment of the second drive mechanism 20. A belt or chain 23 and a driven gear 24 are disposed between the drive gear 21 and the driven gear 22 of the second drive mechanism 20. To speak more specifically, the driven gear 24 is freely rotatably mounted on the input shaft 71*a* via a bearing 40 and engaged with the drive gear 21. The belt or chain 23 is mounted on the driven gear 24 and the driven gear 22. Therefore, after the free end 36b of the shift tool 36 is operated or controlled to drive the brake device 30 to move toward right side of the drawing, the toothed sections 32b of the second end face 32 of the brake device will engage with the teeth 21b of the drive gear 21 of the second drive mechanism to drive the drive gear 21 to synchronously rotate with the transmission shaft 71. Also, the drive gear 21 drives the driven gear 24 to drive the belt or chain 23 to urge the driven gear 22 to drive the output sleeve 66 and the differential mechanism 65 to make the output shaft 71a drive the vehicle wheels W to rotate to reverse the vehicle.

In the embodiment of FIG. 7, in case the rotary shaft 71 is counterclockwise rotated (seen from left side of the drawing), the brake device 30 can be operated to drive the drive gear 21 of the second drive mechanism 20 to counterclockwise rotate. Therefore, the drive gear 21 drives the driven gear 24, the belt or chain 23 and the driven gear 22 to clockwise rotate, whereby the output sleeve 66, the differential mechanism 65 and the output shaft 71b are driven to clockwise rotate to reverse the vehicle. That is, in this embodiment, in the case that the rotary shaft 71 keeps counterclockwise rotating, the brake device 30 can be operated to drive the first drive mechanism 10 or the second drive mechanism 20 to advance or reverse the vehicle.

According to the above, the transmission power switch device assembled with rotary shaft of the present invention has a simplified structure. In comparison with the conventional technique, the cooperative structures of the transmission power switch device are specifically designed to be different from the conventional technique. Through the operation and motion of the brake device 30, the power is selectively transmitted to the first drive mechanism 10 or the second drive mechanism 20. Accordingly, the operation and power transmission are more simplified and direct. This changes the power transmission form and is different from the motion of the conventional technique. The present invention is apparently advantageous over and different from the conventional technique in space form and function.

The above embodiments are only used to illustrate the present invention, not intended to limit the scope thereof. Many modifications of the above embodiments can be made without departing from the spirit of the present invention.

What is claimed is:

1. A transmission power switch device assembled with rotary shaft, comprising a rotary shaft defined with an axis, on the rotary shaft being disposed a freely rotatable first drive mechanism, a free rotatable second drive mechanism and a brake device rotatable with the rotary shaft, wherein:
   the first drive mechanism having a drive gear mounted on the rotary shaft and a driven gear driven by the drive gear;
   the second drive mechanism having a drive gear mounted on the rotary shaft and a driven gear driven by the drive gear of the second drive mechanism; and
   the brake device being at least movable between a first position and a second position to selectively brake the first drive mechanism or the second drive mechanism to output power;
   wherein the driven gear of the second drive mechanism is mounted on a differential mechanism, the differential mechanism having an output sleeve, the output sleeve and the driven gear of the second drive mechanism being keyed with each other, the driven gear of the second drive mechanism being synchronously rotatable with the output sleeve.

2. The transmission power switch device assembled with rotary shaft as claimed in claim 1, wherein each of the drive gear of the first drive mechanism and the drive gear of the second drive mechanism is defined with an end face and teeth formed on the end face.

3. The transmission power switch device assembled with rotary shaft as claimed in claim 1, wherein the first drive mechanism is a reducing gear mechanism, the drive gear of the first drive mechanism being engaged with the driven gear of the first drive mechanism.

4. The transmission power switch device assembled with rotary shaft as claimed in claim 1, wherein the drive gear of the first drive mechanism is mounted on the rotary shaft via a bearing, the drive gear of the first drive mechanism being freely rotatable on the rotary shaft, the driven gear of the first drive mechanism being keyed on an input shaft, the driven gear of the first drive mechanism being synchronously rotatable with the input shaft.

5. The transmission power switch device assembled with rotary shaft as claimed in claim 1, wherein the drive gear of the second drive mechanism is mounted on the rotary shaft via a bearing, the drive gear of the second drive mechanism being freely rotatable on the rotary shaft, the driven gear of the second drive mechanism being mounted on an output shaft.

6. The transmission power switch device assembled with rotary shaft as claimed in claim 1, wherein the brake device includes two end faces respectively defined as a first end face and a second end face, the first and second end faces being respectively provided with toothed sections.

7. The transmission power switch device assembled with rotary shaft as claimed in claim 1, wherein the brake device is freely movably connected on a sleeve member, the sleeve member being prepositioned on the rotary shaft via a key, whereby the brake device and the rotary shaft are synchronously rotatable.

8. The transmission power switch device assembled with rotary shaft as claimed in claim 7, wherein the sleeve member is formed with a rail and the brake device is formed with a channel corresponding to the rail, whereby the brake device is fitted on the sleeve member and movable along the rail.

9. The transmission power switch device assembled with rotary shaft as claimed in claim 1, wherein a shift tool is assembled with the brake device, the shift tool serving to push the brake device to move in a direction parallel to the axis x of the rotary shaft.

10. The transmission power switch device assembled with rotary shaft as claimed in claim 9, wherein the brake device is formed with a recess and the shift tool is at least partially detained in the recess.

11. The transmission power switch device assembled with rotary shaft as claimed in claim 10, wherein the shift tool is defined with a fixed end and a free end positioned in the recess, the fixed end being pivotally connected on a shaft, whereby the free end is freely swingable.

12. The transmission power switch device assembled with rotary shaft as claimed in claim 1, wherein a driven gear is disposed between the drive gear and driven gear of the second drive mechanism, the driven gear being engaged with the drive gear of the second drive mechanism and the driven gear of the second drive mechanism.

13. The transmission power switch device assembled with rotary shaft as claimed in claim 12, wherein the driven gear is freely rotatably mounted on an input shaft via a bearing.

14. The transmission power switch device assembled with rotary shaft as claimed in claim 1, wherein the each of the drive gear of the first drive mechanism and the drive gear of the second drive mechanism is defined with an end face and teeth formed on the end face, the brake device including two end faces respectively defined as a first end face and a second end face, the first and second end faces being respectively provided with toothed sections, when the brake device is positioned in the first position, the toothed sections of the first end face being engaged with the teeth of the drive gear of the first drive mechanism, the drive gear of the first drive mechanism being synchronously rotatable with the rotary shaft, when the brake device is positioned in the second position, the toothed sections of the second end face being engaged with the teeth of the drive gear of the second drive mechanism, the drive gear of the second drive mechanism being synchronously rotatable with the rotary shaft.

15. The transmission power switch device assembled with rotary shaft as claimed in claim 1, wherein a belt or chain and a driven gear are disposed between the drive gear and driven gear of the second drive mechanism.

16. The transmission power switch device assembled with rotary shaft as claimed in claim 15, wherein the driven gear is freely rotatably mounted on an input shaft via a bearing, the driven gear being engaged with the drive gear of the second drive mechanism, the belt or chain being mounted on the driven gear and the driven gear of the second drive mechanism, when the drive gear of the second drive mechanism is synchronously rotated with the rotary shaft, the drive gear of the second drive mechanism driving the driven gear to drive the belt or chain so as to drive the driven gear of the second drive mechanism to drive an output shaft.

17. The transmission power switch device assembled with rotary shaft as claimed in claim 1, wherein the brake device is pushed by a manual control system.

18. The transmission power switch device assembled with rotary shaft as claimed in claim 1, wherein the brake device is pushed by an automatic control system.

19. The transmission power switch device assembled with rotary shaft as claimed in claim 1, wherein the brake device has the form of a wheel-like structure.

20. The transmission power switch device assembled with rotary shaft as claimed in claim 1, wherein the rotary shaft is connected with a power source, which is a motor.

21. The transmission power switch device assembled with rotary shaft as claimed in claim 1, wherein the rotary shaft is connected with a power source, which is an engine.

22. The transmission power switch device assembled with rotary shaft as claimed in claim 1, wherein the rotary shaft includes an input shaft.

23. The transmission power switch device assembled with rotary shaft as claimed in claim 1, wherein the rotary shaft includes an output shaft.

24. The transmission power switch device assembled with rotary shaft as claimed in claim 1, wherein the rotary shaft is connected with a power source, the power source serving to transmit power to an input shaft and an output shaft.

25. The transmission power switch device assembled with rotary shaft as claimed in claim 24, wherein an output gear set is mounted on the output shaft, the output gear set having multiple output gears, a one-way bearing being disposed between each two output gears.

26. The transmission power switch device assembled with rotary shaft as claimed in claim 24, wherein a differential mechanism and an output sleeve are mounted on the output shaft, an output gear set being mounted on the output sleeve, the output gear set having multiple output gears, each output gear being freely rotatably mounted on the output sleeve via a bearing.

27. A transmission power switch device assembled with rotary shaft, comprising a rotary shaft defined with an axis, on the rotary shaft being disposed a freely rotatable first drive mechanism, a free rotatable second drive mechanism and a brake device rotatable with the rotary shaft, wherein:
the first drive mechanism having a drive gear mounted on the rotary shaft and a driven gear driven by the drive gear;
the second drive mechanism having a drive gear mounted on the rotary shaft and a driven gear driven by the drive gear of the second drive mechanism; and
the brake device being at least movable between a first position and a second position to selectively brake the first drive mechanism or the second drive mechanism to output power;
wherein a belt or chain is mounted and connected between the drive gear and driven gear of the second drive mechanism.

28. A transmission power switch device assembled with rotary shaft, comprising a rotary shaft defined with an axis, on the rotary shaft being disposed a freely rotatable first drive mechanism, a free rotatable second drive mechanism and a brake device rotatable with the rotary shaft, wherein:
the first drive mechanism having a drive gear mounted on the rotary shaft and a driven gear driven by the drive gear;
the second drive mechanism having a drive gear mounted on the rotary shaft and a driven gear driven by the drive gear of the second drive mechanism; and
the brake device being at least movable between a first position and a second position to selectively brake the first drive mechanism or the second drive mechanism to output power;
wherein the rotary shaft is connected with a power source, the power source serving to transmit power to an input shaft and an output shaft; and
the input shaft is provided with an input gear set and a transmission control section, the input gear set being at least provided with a spring-like body, a transmission sleeve and a control push sleeve, the rotational power of the input shaft being transmitted through the control push sleeve to the spring-like body to rotate the input gear set.

29. The transmission power switch device assembled with rotary shaft as claimed in claim 28, wherein the transmission control section includes a transmission control electro-apparatus and a rotary disc driven by the transmission control electro-apparatus, the rotary disc serving to control and push the control push sleeve.

* * * * *